US011181208B2

(12) United States Patent
Poe

(10) Patent No.: US 11,181,208 B2
(45) Date of Patent: Nov. 23, 2021

(54) NON-INVASIVE PIPELINE PIG SIGNAL USING VIBRATION SENSORS

(71) Applicant: TDW Delaware, Inc., Wilmington, DE (US)

(72) Inventor: Roger L. Poe, Beggs, OK (US)

(73) Assignee: TDW Delaware, Inc., Wilmington, DE (US)

( * ) Notice: Subject to any disclaimer, the term of this patent is extended or adjusted under 35 U.S.C. 154(b) by 9 days.

(21) Appl. No.: 16/420,989

(22) Filed: May 23, 2019

(65) Prior Publication Data

US 2019/0360611 A1 Nov. 28, 2019

Related U.S. Application Data

(60) Provisional application No. 62/676,090, filed on May 24, 2018.

(51) Int. Cl.
*F16L 1/20* (2006.01)
*F16L 1/26* (2006.01)
(Continued)

(52) U.S. Cl.
CPC ........ *F16L 1/20* (2013.01); *F16L 1/26* (2013.01); *G01N 29/14* (2013.01); *F16L 2101/10* (2013.01)

(58) Field of Classification Search
CPC . F16L 55/26; F16L 55/46; F16L 55/48; F16L 2101/00; F16L 2101/10; F16L 2101/30; F16L 1/20; F16L 1/26; G01V 1/001; G01M 3/005; G01M 3/2823; G01M 3/246; G01N 29/045; G01N 29/14; G01H 1/14; G01H 1/16; G01H 3/04
See application file for complete search history.

(56) References Cited

U.S. PATENT DOCUMENTS 3,517,546 A * 6/1970 Fraser ............... G01M 3/246
73/40.5 R
4,590,799 A * 5/1986 Brown ............... F16L 55/48
73/587

(Continued)

FOREIGN PATENT DOCUMENTS

NO 321704 B1 6/2006

*Primary Examiner* — Benjamin F Fiorello
*Assistant Examiner* — Stacy N Lawson
(74) *Attorney, Agent, or Firm* — GableGotwals

(57) ABSTRACT

A system and method for detecting passage of a pipeline pig, the system and method including a passive impulse detector [10] having a housing [13]; a non-intrusive connection [15] of the housing to an exterior wall [17] of a pipeline [P], at least one vibration sensor [11] housed by the housing; and signal processing [23] including at least one band pass filter [27] configured to receive data collected by the vibration sensor, the vibration sensor and band pass filter configured to monitor frequencies in a predetermined range indicating the impulse. The selected frequencies should be those more easily detectable above the baseline (signature or natural resonance) frequency of the section of pipeline being monitored. In some embodiments, the selected frequencies are lower frequencies. No portion of the passive pipeline pig signal intrudes into an interior of the pipeline.

11 Claims, 6 Drawing Sheets

(51) Int. Cl.
*G01N 29/14* (2006.01)
*F16L 55/48* (2006.01)
F16L 101/10 (2006.01)

(56) References Cited

U.S. PATENT DOCUMENTS

| | | | |
|---|---|---|---|
| 5,417,112 A * | 5/1995 | Rosenberg | G01B 7/003 |
| | | | 324/207.22 |
| 5,549,000 A | 8/1996 | Brown et al. | |
| 6,965,320 B1 * | 11/2005 | Casey | F16L 55/48 |
| | | | 324/71.2 |
| 8,127,621 B2 | 3/2012 | Breen et al. | |
| 8,261,623 B2 * | 9/2012 | Miller | F16L 55/48 |
| | | | 73/865.8 |
| 2004/0261547 A1 | 12/2004 | Russell et al. | |
| 2011/0139538 A1 * | 6/2011 | Hill | G01M 3/243 |
| | | | 181/123 |
| 2012/0067126 A1 * | 3/2012 | Hartog | F16L 55/48 |
| | | | 73/584 |
| 2012/0312078 A1 * | 12/2012 | Bakhtiar | G01M 3/2815 |
| | | | 73/40.5 A |
| 2015/0300907 A1 | 10/2015 | Giunta et al. | |

* cited by examiner

NON-INVASIVE PIPELINE PIG SIGNAL USING VIBRATION SENSORS

CROSS-REFERENCE APPLICATIONS

This application claims priority to U.S. Provisional Patent Application No. 62/676,090, titled Pipeline Pig Signal using Vibration Sensors, filed May 24, 2018.

BACKGROUND

This disclosure is in the field of devices commonly known as pig signals that are used to detect the presence or location of a pigging or inspection tool as the tool travels between a launching and receiving trap of pipeline.

Prior art pig signals make use of a mechanical trigger or a magnetic trigger which creates a need for an invasive sensing mechanism. Other pig signaling devices combine flow and acoustic signatures to compare pressure boundaries and the passage of a pig. None of the prior art signals use differentiation of resonance to determine the passage of a pig with respect to time.

For example, Roxar Flow Measurement AS U.S. Pat. No. 8,127,621, directed to a Locking Mechanism with Acoustic Barrier for Mounting a Sensor on a Pipe, and Norwegian patent NO 321704 issued for a sensor to be received in the locking mechanism, disclose a device for monitoring fluid flow velocity, particle amount in fluid flow, and gas/vortex fraction in the fluid flow. An acoustic transducer is adapted to simultaneously or alternate reception and sending of acoustic signals. By using two or more transducers associated with the same rudder (pipe), the data collected by passive listening from these two can be cross-correlated to find the time difference between events in the rudder (pipe) and thus the fluid velocity in the rudder (pipe). In this case, two transducers are mounted in the same unit (acoustic transmitter), with a selected distance from each other. One of the transducers can then be equipped for clean, continuous passive listening. The frequency range will typically be within range 20 kHz to 1 MHz.

Noise from sand striking a rudder (pipe) wall is characterized by having a relatively flat frequency spectrum from low frequencies (<100 kHz) to high frequencies (>1 MHz). Fluid/gas flow noise transferred to the rudder wall is strongest at frequencies below 100 kHz and decreases at higher frequencies. This allows the flow rate to be determined by splitting the received signal into multiple frequency bands, and analyzing these using known signal processing techniques. The flow rate can also be found when analyzing the received signals in the time domain. Statistical parameters such as variance and absolute value, will vary with both compositions (gas/liquid ratio) and velocity of the flow medium, and will thus be able to enter into a mathematical model to derive these values.

The system and method of the '621 and '704 patents are not adapted for detecting a pipeline pig, include at least one active sensor that transmits a signal through the pipeline product at a right or oblique angle to the pipeline, are frequency dependent—operating in a range of 20 kHz to 1 MHz and specifically looking for events having a natural or flat frequency spectrum within this range—nor are they designed to detect an impulse or series of impulses in an axial, radial, or axial and radial direction of the pipe at frequencies below 20 Hz.

SUMMARY

A system and method of this disclosure for detecting passage of a pipeline pig detects a series of impulses that indicate the passage of the pig in an area or section of a pipeline. The impulse may be detected using a non-intrusive detector of this disclosure that includes a vibration sensor, the vibration sensor detecting the impulse. The impulse may be detected by the sensor prior to the pipeline pig passing under the detector and may continue to detect the impulse as the pig moves away from the detector. No portion of the impulse detector intrudes into an interior of the pipeline.

The detector may include a housing; a non-intrusive connection of the housing to an exterior wall of the pipeline, at least one vibration sensor housed by the housing and configured to detect the impulse; and signal processing including at least one band pass filter configured to receive data collected by the at least one vibration sensor. The sensor and band pass filter may be determined based upon specific frequencies that work best on a particular pipeline section of interest. The filter selected may pass frequencies above or below that of the pipeline section's baseline (signature or natural resonance) frequency, which may be determined by routine testing. In some applications, this may mean a low pass filter passing selected frequencies. In other applications it may mean a high pass filter.

The impulse may be in an axial, radial, or axial and radial direction of the pipeline and is distinguishable above the baseline frequency of the pipeline section. The impulse is independent of the baseline frequency of the pipeline section and can be detected over a wide range of these baseline frequencies. Generally speaking, and regardless of the baseline frequency of the pipeline section, the amplitude of the impulse generally decreases as its frequency increases, making detection at lower frequencies easier and requiring less amplification when compared to detecting the impulse at higher frequencies. The system and method may be configured to detect a predetermined number of two or more impulses (peaks) within a predetermined period of time to differentiate pig passage from another event such as, but not limited to, the opening or closing of a valve.

In embodiments, the pipeline may have a first section with a first baseline frequency, a second section with a second different baseline frequency, and a third section with a third different baseline frequency, the impulse being detectable above the first, second, and third different baseline frequencies. By way of a non-limiting example, the first section may be a significant distance from sources of vibration such as, but not limited to, pipeline equipment or environmental or weather related disturbances, making the velocity of pipeline product the primary source of the baseline signature. The second section may be in a processing area that includes pumps or compressors or it may be located near an area of heavy air or ground traffic or construction (or both pumps and compressors and near heavy traffic and construction). The third section may be in a pig launching or receiving area of the pipeline. Again, regardless of the baseline frequency of the pipeline section, the impulse is detectable.

Embodiments of this disclosure provide a non-invasive pig signaling device for which no cutting into or welding, x-ray, hydro-testing or positive material identification of the pipeline is required. In embodiments, the pig signaling device includes a housing with a mechanical (e.g. weldable) base or a magnetic base, the housing containing a vibration sensor along with a battery or battery pack to power the sensor. A sensor of this disclosure is passive and does not transmit a frequency or sound to the pipe, or to the pipeline product or pig, but rather receives or detects an impulse to the pipe above that of natural resonance or background noise due to product flow and equipment such as pumps, compressors, motors, and valves. Additionally, a system and method of this disclosure is not frequency dependent, nor does it monitor the pipe to detect a certain natural frequency or vibration of the pipe or product flow (typical of acoustic approaches). Instead, the system and method monitors the pipe for a disturbance in an axial direction regardless of the frequency of background noise inherent in or experienced by the pipe from other sources. The vibration sensor may be one or more accelerometers while also maintaining multiple switching relay contacts, a transmitter, as well as the ability to integrate counting mechanisms and serialized data relative to the pigging device. When coupled with a communication capability the pig signal can then contact a control system on or off site to identify key attributes relative to the pig as it passes the signaling device.

Because the vibration of the flowing fluid is fixed with the pipeline and the velocity of the fluid, any positive deviation in vibration may be sensed and acknowledged by the sensor. The sensor can be tuned to identify the threshold above which any increased movement when compared to time would indicate the passing of a pig. Anything below this threshold may be assumed to be the natural resonance of the pipeline interaction with the fluid. The detector may be in a sleep or reduced power mode until the impulse is detected and returned to that mode once the pig has passed the detector and the impulse is no longer detectable by the sensor.

Compared to prior art pig signals, embodiments of this disclosure provide a relatively inexpensive means to acknowledge the launching, receiving, or passing of a pig. Because installation of the signal onto a pipeline is non-intrusive, installation is more cost effective than prior art signals which require material testing, cutting into, welding of the pipeline. And because the interior of the housing is not in fluid communication with, or exposed to, the fluid contents of the pipeline, issues associated with pipeline debris and dirt are avoided. Safety is also increased because there is no potential leak path created by the pressure differential from inside the pipeline to the external ambient pressure (unlike the typical mechanical leak path created by an invasive flanged or threaded application point).

DETAILED DESCRIPTION

Figure 1:
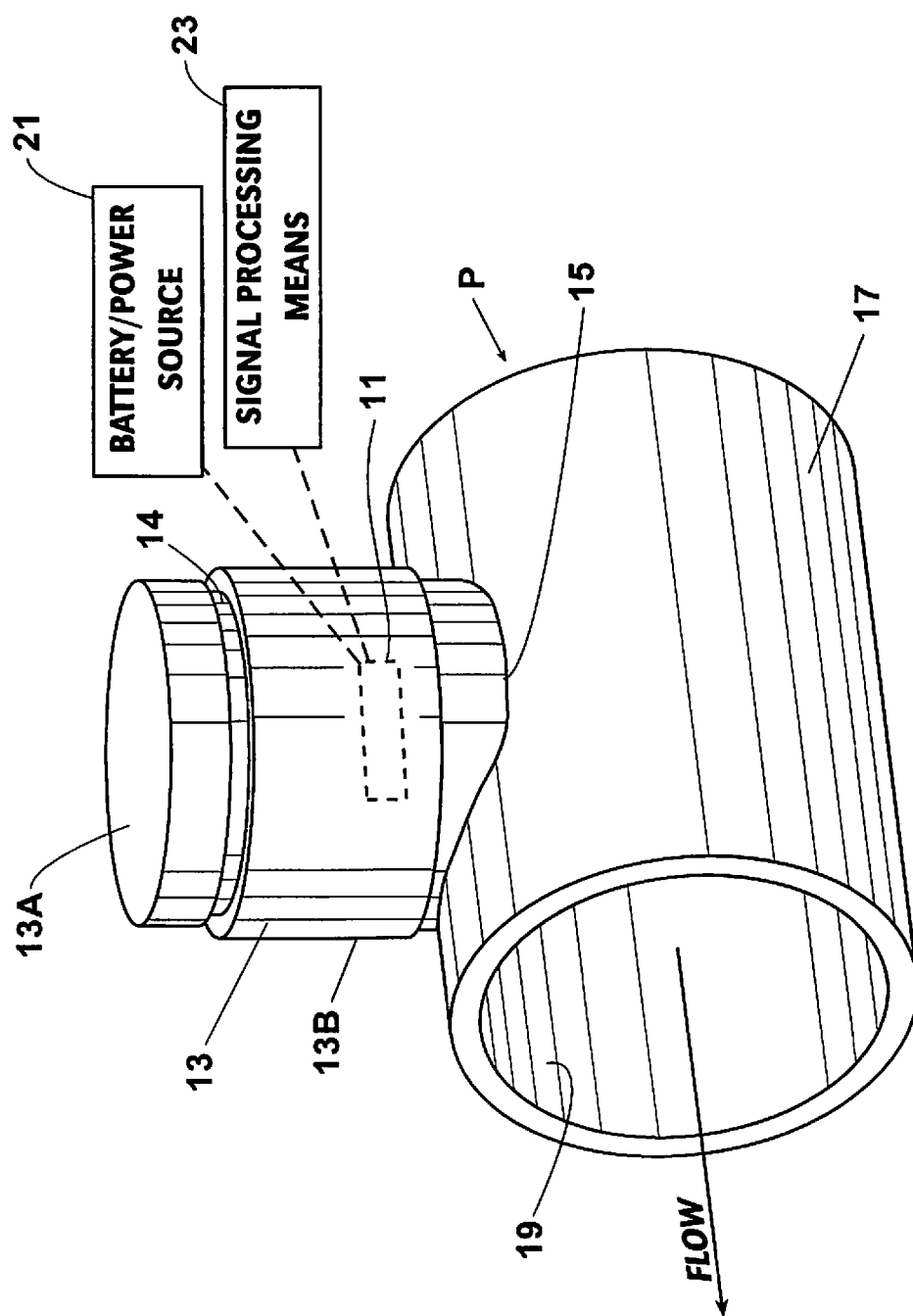
FIG. 1 is an embodiment of an impulse detector this disclosure containing a vibration sensor and a battery pack to power the sensor. The detector may be configured as a pipeline pig signal. The housing attaches to the pipeline by way of either a permanent mechanical or a magnetic base.
Figure 2:
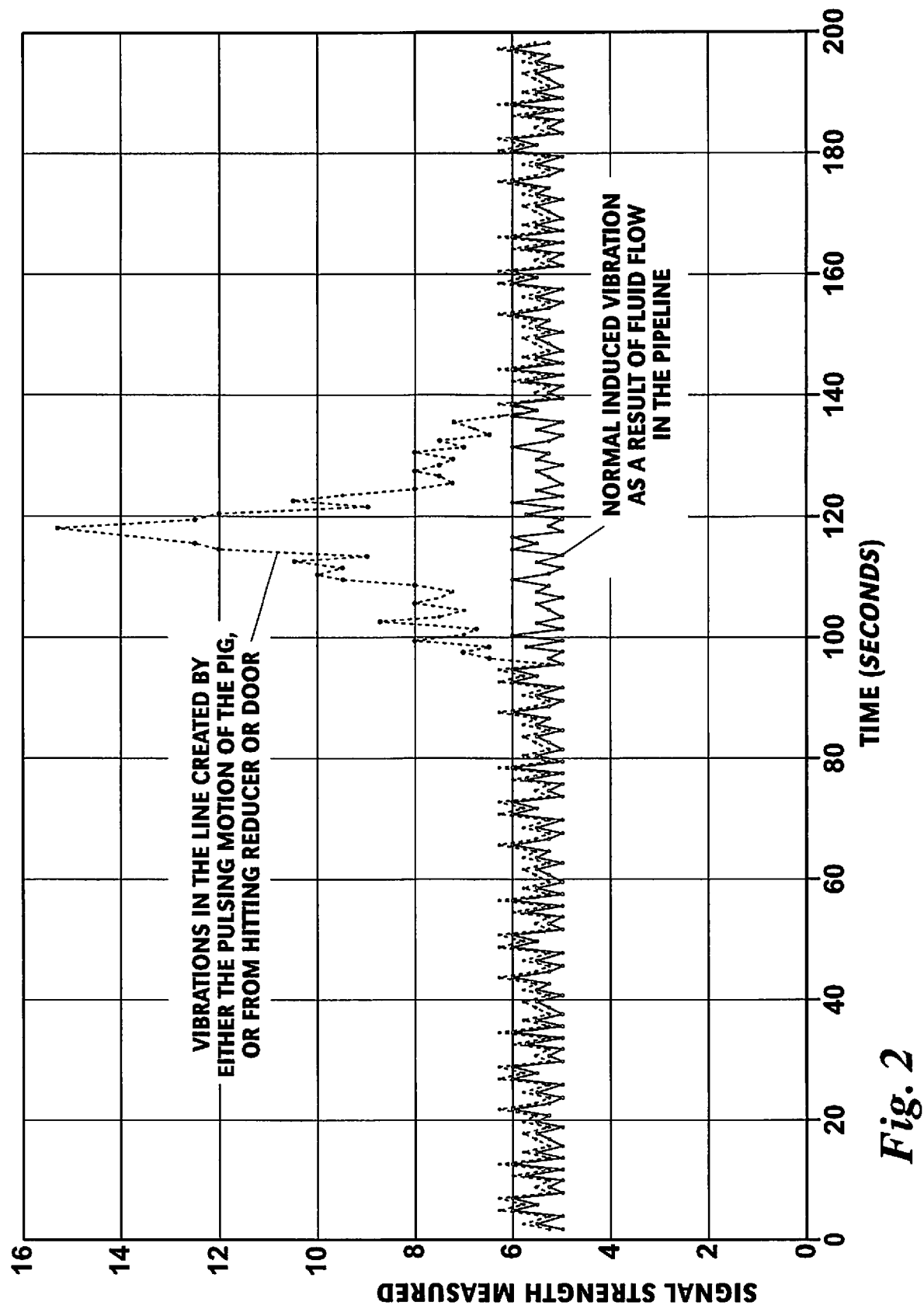
FIG. 2 is an example inferred signature imprint indicating a pig passing an embodiment of a vibrational sensing sensor of this disclosure. See also the data shown in FIGS. 3 & 4. The impulse generated from the passing pig is detectable over a broad range of pipeline (background noise) frequencies. The threshold for detection may be set at any frequency that reliably indicates passage for a given pipeline section.
Figure 3:
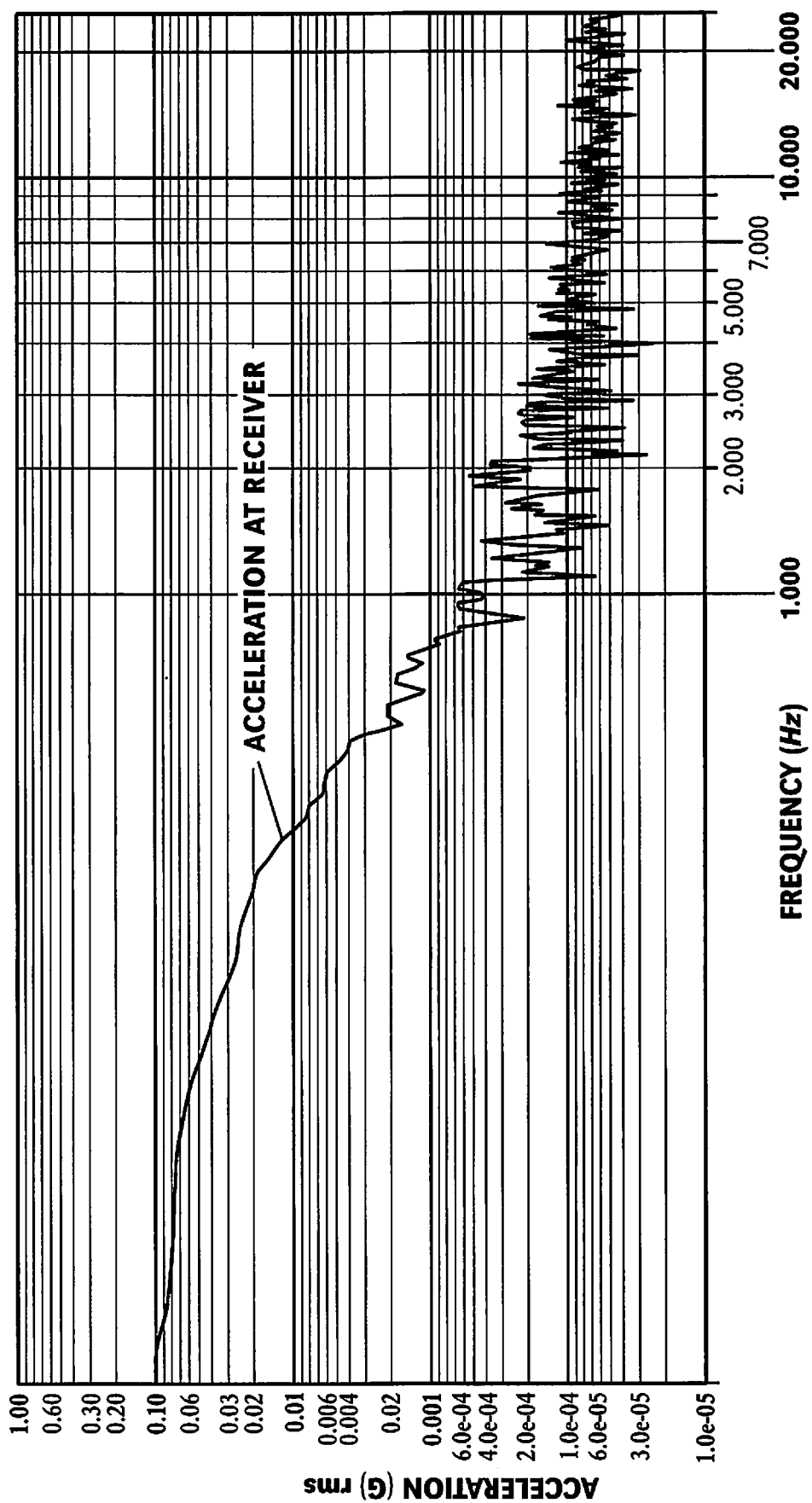
FIG. 3 is an example plot of fast Fourier transform ("FFT") calculations used to analyze a pig movement data stream taken during a test run using a vibration sensor sized to best isolate and measure the impulse from the pig. The calculations helped to determine the best or optimum frequency to monitor in the particular application. The FFT calculations show that the pig is observed as more of an impulse than an acoustic image. Note the data of FIG. 3, and of FIG. 4, is from when a pig passes, not the total raw output of pig signal of this disclosure.
Figure 4:
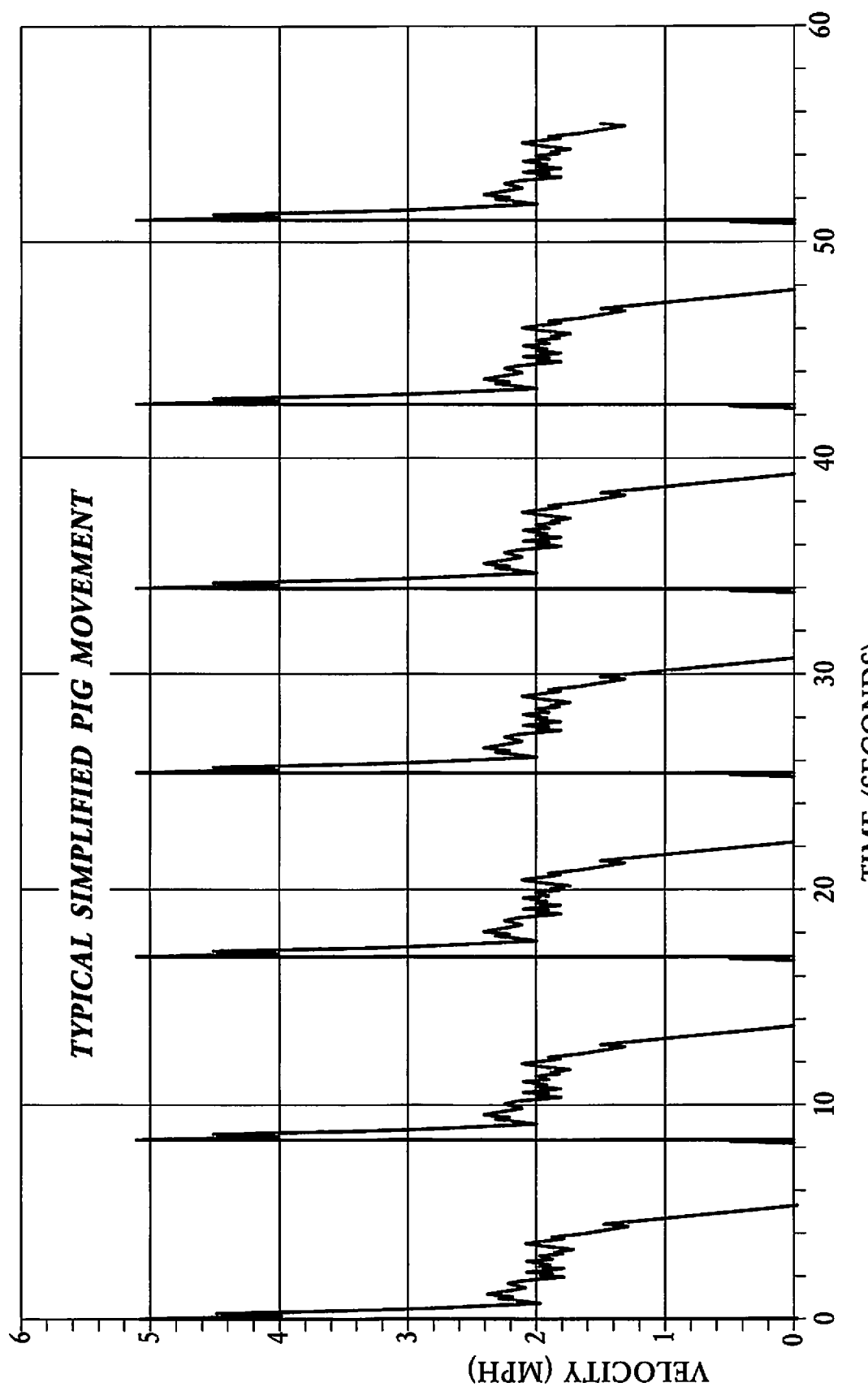
FIG. 4 is an example plot of a typical pig movement data stream of FIG. 3. Each time the pig moves forward it creates a momentum spike transferred to the pipe. This momentum exchange creates an axial surge to the pipe, which is a measurable event. The exchange may also create a radial force to the pipe.
Figure 5:
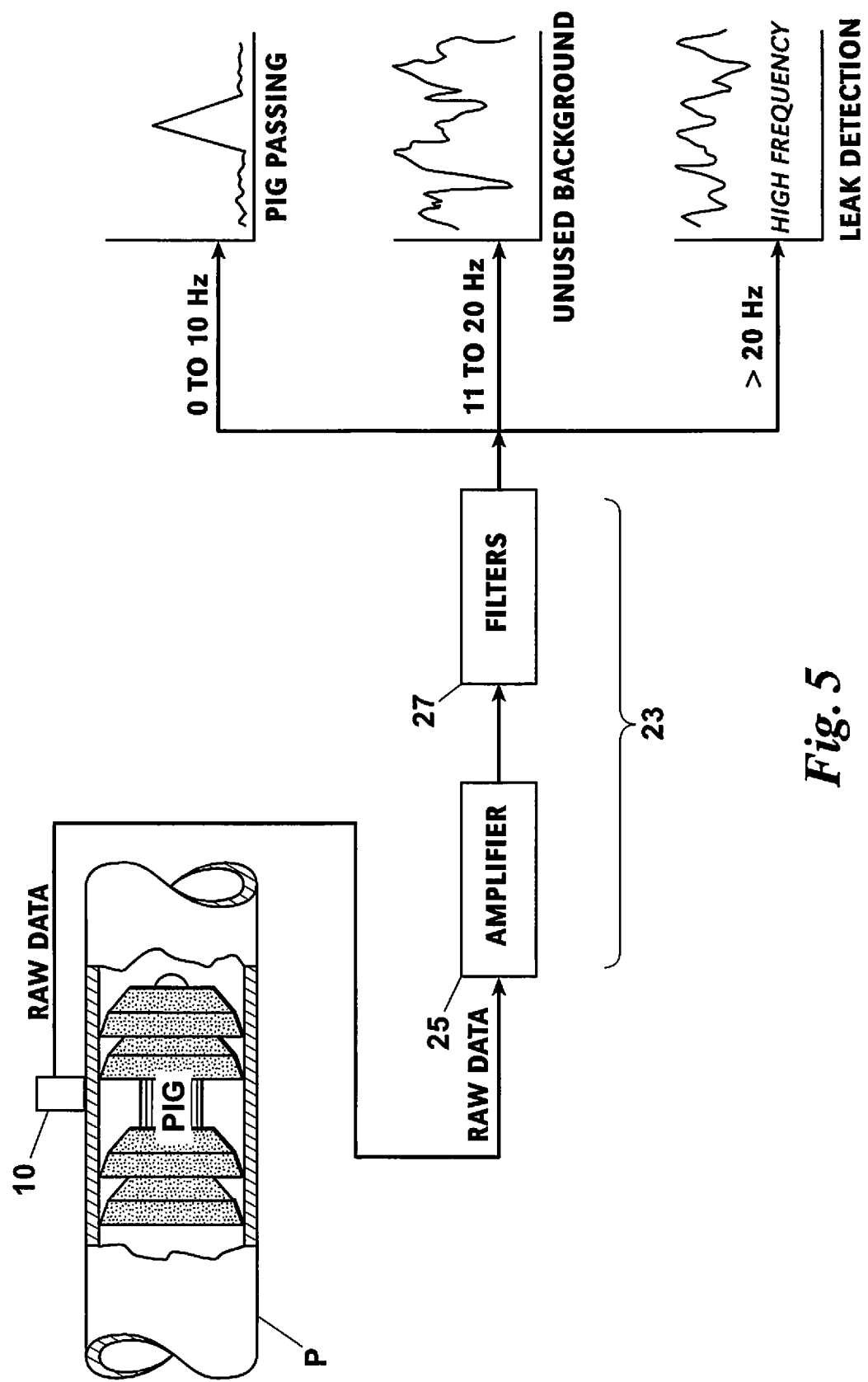
FIG. 5 is a schematic of an embodiment of a system and method using a non-intrusive pig signal of this disclosure coupled with band pass filtering to detect pig passage in a range of 1 Hz to 10 Hz. This is a non-limiting example. The band pass filter may be one configured to pass selected frequencies different than those of this example depending on the pipeline section being monitored.
Figure 6:
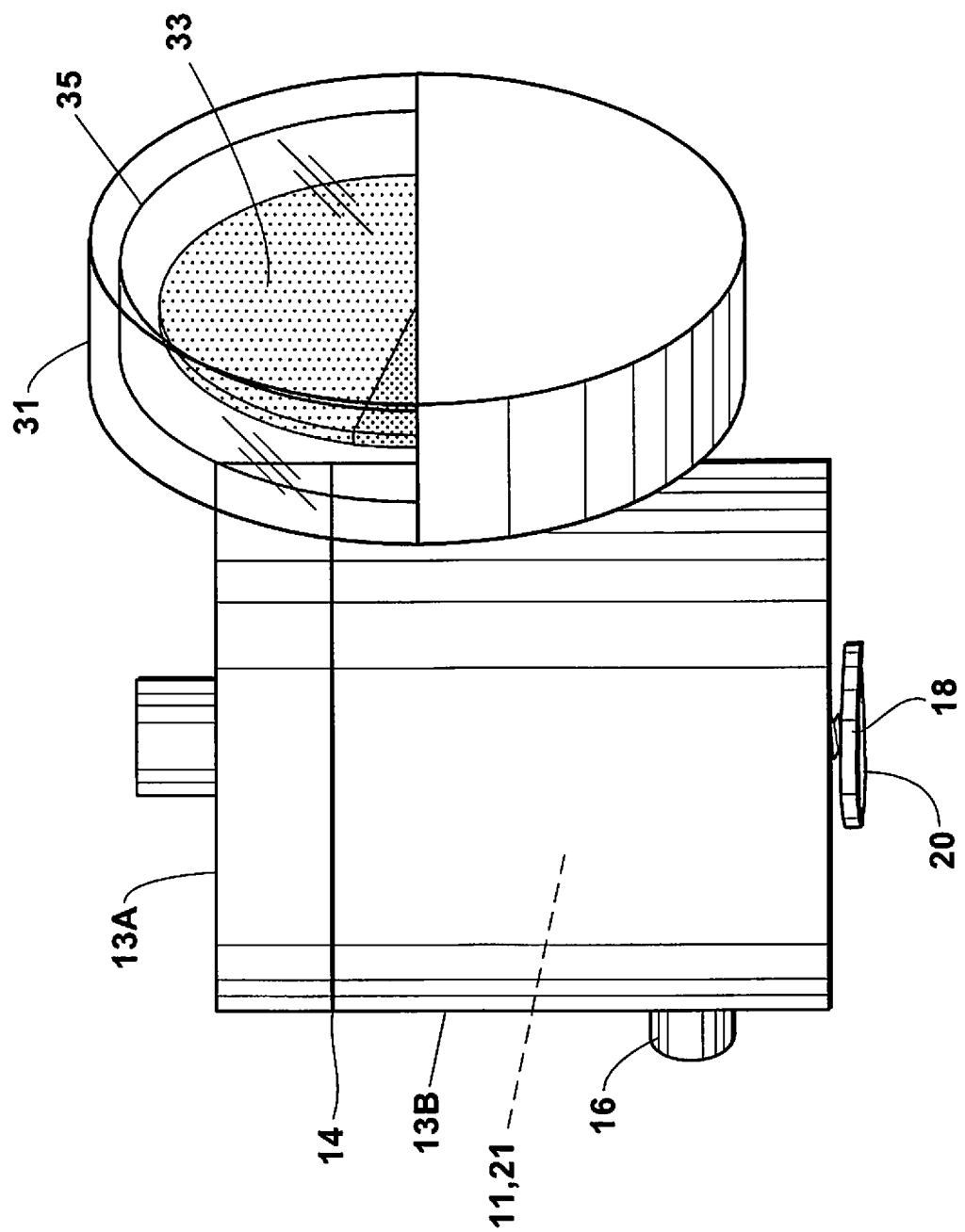
FIG. 6 is another embodiment of a detector of this disclosure configured as a pipeline pig signal.

A pipeline generates a natural vibration or resonance as the internal fluid passes through the pipeline. Equipment such as pumps, motors, and valves create additional vibration, as does weather related events such as wind and construction related events such as digging in the proximity of the pipeline or contacting the pipe with a piece of equipment. A pig moving in the pipeline may provide positive deviation from this natural resonance. For example, when the pig is being launched into a pipeline it may hit one or more eccentric reducers during the launching scenario. When the pig is being received at the end of its run, it may slam into other pigs or a door of the receiving trap. The vibration caused by impact with other pigs or the door is generally of lower magnitude (amplitude) than that caused by the pig hitting reducers, but is higher than the natural resonance of the flowing fluid. Additionally, as the pig travels along the pipeline it surges, continually decelerating and accelerating as it moves against friction and weld seams along the pipeline. This change in momentum is exchanged to the pipeline in the form of a momentary change in resonance as the pig passes a section of pipe. Embodiments of this disclosure take advantage of these changes in resonance to detect the presence of a pipeline pig such as, but not limited to an inspection pig or a cleaning pig. Augmenting the data to include the weld seams allows sensing of pigs at a significant distance from the launcher or receiver.

In experimental runs using embodiments of a system and method of this disclosure, vibration measurements were taken on a test loop containing a pig and analyzed using fast Fourier transform ("FFT") calculations. The FFT calculations show that the pig, which is moving forward through the line in spurts, is observed as more of an impulse rather than an acoustic image. The pig's start and stop movement allows momentum to be transferred to the pipe as a pulse in the axial, radial, or axial and radial direction. The system and method of this disclosure detects this impulse, and the series of impulses, as the pig nears the sensor, passes it, and moves away, indicating a pig passage. The impulses are then used as an electronic signature that a pig has passed the sensor. The impulse is independent of the baseline (signature or natural resonance) frequency of the pipeline section and can be detected over a wide range of these baseline frequencies.

Regarding the stop-and-start movement of the pig, the pig periodically stops as differential pressure drops with bypassing fluid and friction climbs with temperature. As the pig movement slows or stops, the pressure behind the pig builds to break friction again. As the pig begins to move, it's velocity rapidly increases due to momentary high pressure gradient. The pig continues to move forward for several fractions of a second and again builds heat due to friction. As the pig heats it becomes somewhat sticky which enhances the frictional force of the pig. As this happens the frictional force elevates and brings the pig movement once again to a stop. Each time the pig moves forward it creates a momentum spike transferred to the pipe. This momentum exchange creates a surge to the pipe which is a measurable event. The surge is primarily in an axial direction but can also be in a radial direction as well. As discussed above, this event is observable as an impulse to the pipe as shown in the FFT calculations. Further, this impulse is observable across a broad range of pipeline frequencies.

Signal processing including at least one band pass filter is configured to receive data collected by the vibration sensor and pass frequencies in a predetermined range. The band pass filter may be determined based upon specific frequencies that work best on a particular pipeline section of interest. The filter selected may pass frequencies above or below that of the pipeline section's baseline (signature or natural resonance) frequency, which may be determined by routine experimentation or testing. In some applications, this may mean a low pass filter passing selected frequencies. In other applications it may mean a high pass filter. In yet other applications, the filter may pass mid-range frequencies. Generally speaking, and regardless of the baseline frequency of the pipeline section, the amplitude of the impulse generally decreases as its frequency increases, making detection at lower frequencies easier and requiring less amplification when compared to detecting the impulse at higher frequencies. Several filters could be utilized, and, under some conditions, dip switches may be included to make the sensor more tunable for a particular application when needed.

In some embodiments, the selected frequency is in a range of 0.1 Hz to 35 kHz, 0.5 Hz to 10 Hz, 20 Hz, 30 Hz, 40 Hz, or 50 Hz; 50 Hz to 100 Hz; 100 Hz to 200 Hz, 300 Hz, 400 Hz, or 500 Hz; 500 Hz to 1 kHz; 1 kHz to 5 kHz, 10 kHz, 15 kHz, or 20 kHz; greater than 20 kHz to 30 kHz, 40 kHz, 50 kHz, 60 kHz, 70 kHz, 80 kHz, 90 kHz, or 100 kHz, 100 kHz to 200 kHz, 300 kHz, 400 kHz, 500 kHz, 600 kHz, 700 kHz, 800 kHz, 900 kHz, or 1,000 kHz, or some other range up to the acoustic detectable limit, there being subranges within, or overlapping ranges between, the broader ranges listed here. In testing, for example, the impulse was observable in a range of 0.1 Hz to 35 kHz. It is expected that the impulse is observable above 35 kHz; however, this was the upper limit tested by the inventor. The band pass filter or filters may be configured for a selected frequency range that, based upon a pipeline section of interest, is best for impulse detection.

Referring to the drawings, in embodiments of an impulse detector 10 of this disclosure one or more vibration sensors 11 may be housed within a housing 13 having a non-intrusive mechanical attachment means 15 connectable to the exterior wall 17 of the pipeline P. For example, the detector 10 may be fitted if welded directly to the pipe and may include a threaded element (which would be angled to facilitate a typical weld). The detector 10 may be configured as a pipeline pig signal. Multiple detectors 10 may be spaced from one another along a pipeline or section of pipeline. The detector 10 includes a power source 21 and signal processing means 23 with filtering capability and an amplifier to allow small signals to be readily utilized. The detector 10 does not intrude into or past the interior wall 19 of the pipeline. The housing 13 may be a two-part housing including an O-ring seal groove face 14, a top cap section 13A and lower body section 13B, the top cap section 13A being O-ring sealed. The housing 13 may also include an I/O communication port 16. A battery or battery pack 21 may be included to power the sensor 11. The detector 10 may also include a sign housing 31 and signage 33. The sign housing 31 may include a clear window portion 35. The signage 33 may be a rotating LED illuminated signage. Additionally, the detector 10 can be configured to contact a remote control room to confirm the passage of the pig and its count. The control room may be up to several miles away from the detector. To enable this communication, the detector 10 can make use of a modem or cellular communication technologies. The detector 10 could also be designed with an infrared or ultraviolet wave hand held control that would allow pipeline contractors or operators and technicians to reset the device from a pickup truck as opposed to approaching the sensor and resetting the instrument manually. Using a remote device to reset and arm the detector 10 could save significant time for operators in the field.

By way of a non-limiting example, the mechanical attachment means 15 may include a permanent weld or a magnetic base or their equivalent. The means may include an attachment base 18. Attachment to the pipeline can be a welded connection on a flat portion 20 of the attachment base, a magnetic connection (which can be part of the weldment), or an epoxy- or chemical-related connection to ensure a positive, not easily removed, connection. Because the pig signal 10 is directed at impulse type measurements; it is important to ensure the connective surfaces are solidly placed such that little or no dampening is created as a function of the methodology employed.

A sensor 11 of this disclosure does not transmit a frequency or sound to the pipe, or the pipeline product, but rather receives or detects an impulse to the pipe due to the start-and-stop movement of the pig as it approaches, moves past, and moves away from the detector 10. The sensor 11 is one selected to sense a vibration level and frequency range above that of the natural resonance of the pipeline fluid. What is being sensed is a disturbance caused by the pig and evidenced by increased amplitude above that of the background noise. The frequency selected should be one that is least sensitive to the background noise or frequency of the pipeline section. For example, in areas where the pipeline section includes pumps or motors, the selected frequency can be one above or below that at which the pumps or compressors operate (e.g., above or below 30 Hz to 55 Hz, matching an operational band of 1800 rpm to 3300 rpm).

In embodiments, the sensor 11 may be one or more accelerometers. Other vibration measuring instruments of a kind known in the vibration sensing art may be used provided the instrument is sensitive enough to sense a positive deviation in vibration above that of the flowing fluid. Because a sensor of this disclosure does not emit any type of acoustic signature to sense the pig, the sensor can sit dormant for hours or days on end waiting for the lower level impulse noise to indicate that a pig is eminent. This lower level vibration or impulse can be used to wake up the pipeline pig signal, at which time the sensor would be energized and wait for the appropriate waveform as noted in testing to designate the passing of a pig. The savings in power consumption then becomes significant, allowing the power cell to last on the terms of years as opposed to weeks.

Because a pipeline pig rapidly accelerates and decelerates as it travels along with product flow in the pipeline, it creates a disturbance or impulse in an axial direction of the pipe that can be detected across a broad range of frequencies. (Note there is a relatively smaller impulse in the radial direction as well as the axial direction. The axial direction is however appreciably higher than the radial but radial could be used in embodiments.) This impulse may appear having an amplitude of 3× to 4× that of the background noise and, in embodiments, may be amplified to a multiple above this (e.g. another 3× to 5×, making the signal about 10× to 20× above that of the background noise, or by some other× multiple preferred). High or low band pass filtering can be used to allow the impulse to come through above the background frequency of the pipeline section in order to detect the impulse due to passage of a pig. In some embodiments, this range is 0.1 Hz to 10 Hz, there being subranges within this broader range. A range above up to about 20 Hz may be used but detection is not as robust at higher frequencies across the broad range of frequencies from 0 Hz to 35 kHz. By way of a non-limiting example, a pipeline pig may operate within a frequency range of 3 Hz to 7 Hz, with motor-driven equipment such as pumps and compressors operating within a frequency range of 30 Hz to 55 Hz (matching an operational band of 1800 rpm to 3300 rpm). Other pipeline components such as valves can be isolated as a single pulse or shock-type vibration wave and readily identified. The sensor 11 may be configured to detect vibration or impulse to the pipe in a range of 0.1 Hz to 10 Hz. Again, other detectable limits may be used.

The sensor 11 may be in electronic or network communication with computerized signal processing means 23 including a microprocessor and associated software. All or a portion of the signal processing means 23 may be included in the sensor 11 or detector 10. In embodiments, the signal processing means 23 include an amplifier 25 and band pass filters 27. Filtering and amplification allow the sensor 11 to identify the passage of the pig. The bypass filter 27 may be sized for use and located integral to the sensor 11 or detector 10. In some embodiments, the amplifier 25 and filter 27 can be placed external in, for example, a control cabinet local to the pipeline section. Testing may be done on specific pigs when in operation at operational velocities to better isolate the frequencies of the pig. In many cases, it is expected that the pig will operate in a range of 1 Hz to 10 Hz, 2 Hz to 9 Hz, 3 Hz to 8 Hz, 4 Hz to 7 Hz, there being subranges within these broader ranges. Because the sensor 11 is attached to the pipeline P, any increase in vibration overt the natural resonance of the flowing fluid's interaction with the pipeline wall 17, 19 and other equipment will be sensed and acknowledged. The sensor 11 is therefore tuned to allow the discrete vibration of the fluid be a normal frequency of operation. For example, when the pipeline increases in vibration due to the movement of a pig, the amplitude of the signal rises above the preset filter point or level. This rise indicates the passage of a pig.

The signal processing means 21 may be used to transmit serialized data from the pig, maintain a count of pigs passing a corridor, use relays within the pig signal to light indicators or move signage to indicate that a pig had passed for someone at a distance who might be using visual recognition. Timing relays may also be used to automatically reset the switch, change lights, or close the signage to re-arm the pig signal for the next passage of a tool in the pipeline. The signaling device 10 may allow people local to the pipeline to see that a pig has passed while also allowing operators in a control room several hundred miles away to do the same. Infrared- or ultraviolet-type hand held controls may also be implemented in embodiments to allow technicians to remotely reset and acknowledge the pig passing as part of the work routine. Allowing the sensor to be acknowledged and or reset from a pickup truck allows for a significant savings in time. It also allows for safety in that the resetting of the instrument can be done at a distance, allowing the technician is never in the working area of the pipeline where high pressures, $H_2S$, and escaping fluids can be of potential issue to the technician.

In embodiments of a method of using the pig signal 10, the method includes sensing an impulse above that of a baseline (signature or natural resonance) vibration, the baseline vibration caused by fluid flow interacting with a pipeline as well as other sources of pipeline vibration such as pumps and compressors, wherein the impulse is detected by a detector 10 containing at least one vibration sensor 11 in communication with an exterior wall 17 of the pipeline. The impulse can be detected across a broad range of pipeline vibrations. The method may also include determining this signature frequency for a section of pipeline to be monitored. Fast Fourier transform calculations or their equivalent may be used to decide the best or optimal range in which to detect the impulse. The sensor 11 can then be sized to best isolate and measure the impulse from the pig. The impulse can be first detectable a substantial distance upstream of the detector 10. By way of a non-limiting example, and depending on the desired sensitivity of the detector 10, the impulse may be first detectable upwards of 1,500 feet to 10 feet away from the detector 10 [457 m to 3 m], there being other upper limits and subranges within this broader range (e.g. 500 feet or 152 m).

As previously discussed, signal processing including at least one band pass filter can be configured to receive data collected by the vibration sensor 11 and pass frequencies in a predetermined range. The band pass filter 27 may be determined based upon specific frequencies that work best on a particular pipeline section of interest. The filter selected may pass frequencies above or below that of the pipeline section's baseline frequency, which may be determined by routine experimentation or testing. In some applications, filter 27 may be pass selected low frequencies. In other applications it may pass selected mid-range or high frequencies.

The example embodiments described here may be subject to modification without departing from the scope of the following claims. The claims include the full range of equivalents to which each recited element is entitled.

The invention claimed is:

1. A method for detecting a pipeline pig traveling within a pipeline, the method comprising:

sensing, by way of a passive pipeline pig signal [10], a series of impulses within a selected section of the pipeline, the series of impulses having a frequency different than that of a signature frequency of the selected section of the pipeline, the series of impulses being in an axial direction and caused by changes in momentum of the pipeline pig as it continually accelerates and decelerates during its travel between adjacent sources of vibration within the selected section of the pipeline due to changes in the frictional forces between the pipeline pig and the selected section of the pipeline, the adjacent sources of vibration being vibration sources selected from the group consisting of pipeline pumps, motors, and compressors; pipeline product and pipeline product flow; pipeline valves; pipeline weld seams; pipeline pig launchers and receivers; and pipeline reducers;

the pipeline pig decelerating as the frictional forces increase and accelerating as the frictional forces decrease, a differential fluid pressure behind the pipeline pig increasing as the frictional forces increase and decreasing as the frictional forces decrease, each change in the momentum causing an impulse in the axial direction of the series of impulses;

wherein the passive pipeline pig signal comprises:
- a housing [13];
- non-intrusive means [15] for connecting the housing to an exterior wall of the pipeline, wherein no portion of the passive pipeline pig signal intrudes into an interior of the pipeline;
- at least one vibration sensor [11] housed by the housing; and
- signal processing means [23] including at least one band pass filter [27] configured to receive at least a portion of the data collected by the at least one vibration sensor;
- the at least one vibration sensor and band pass filter configured to monitor the selected section of the pipeline and detect the series of impulses.

2. The method of claim 1, wherein the at least one vibration sensor and band pass filter are configured to monitor frequencies in a predetermined range of 0.1 Hz to 20 kHz.

3. The method of claim 1, wherein the at least one vibration sensor and band pass filter are configured to monitor frequencies in a predetermined range that includes at least one frequency above 20 kHz.

4. The method of claim 1, wherein the at least one vibration sensor and band pass filter are configured to monitor frequencies in a predetermined range that includes at least one frequency under 20 kHz.

5. The method of claim 1, wherein the signal processing means includes at least one amplifier [25] configured to receive the portion of the data collected by the at least one vibration sensor.

6. The method of claim 1, wherein the non-intrusive means includes a base [18] connectable to the exterior wall of the pipeline.

7. The method of claim 6, wherein the base is connectable to the exterior wall of the pipeline by a connection selected from the group consisting of a weldment and a chemical adhesive.

8. The method of claim 1, wherein the at least one vibration sensor includes an accelerometer.

9. The method of claim 1, wherein the series of impulses extends over a predetermined span of time.

10. The method of claim 1, further comprising, the passive pipeline pig signal transmitting data indicating passage of a pig, a count of total pigs detected, or both the passage and the count.

11. A method for determining a signature frequency of a selected section of pipeline [P], the method comprising:
- sensing, by way of a passive pipeline pig signal [10] located on an exterior wall [17] of the selected section of the pipeline, a series of impulse vibrations in an axial direction and between adjacent sources of vibration, the series of impulse vibrations caused by pipeline pig continual start and stop movement through the selected section of the pipeline and caused by changes in momentum of the pipeline pig as it continually accelerates and decelerates during its travel within the selected section of pipeline due to changes in frictional forces between the pipeline pig and the selected section of the pipeline, the pipeline pig decelerating as the frictional forces increase and accelerating as the frictional forces decrease, a differential fluid pressure behind the pipeline pig increasing as the frictional forces increase and decreasing as the frictional forces decrease, each change in the momentum causing an impulse in the axial direction, the series of impulse vibrations being in a different frequency range than a fluid flow through the selected section of the pipeline and at least one other vibration source interacting with the selected section of the pipeline; and
- analyzing the series of impulse vibrations to determine a signature frequency range of the selected section of the pipeline;
- wherein the adjacent sources of vibration are vibration sources selected from the group consisting of pipeline pumps, motors, and compressors; pipeline product and pipeline product flow; pipeline valves; pipeline weld seams; pipeline pig launchers and receivers; and pipeline reducers;
- wherein the passive pipeline pig signal comprises:
  - a housing [13];
  - non-intrusive means [15] for connecting the housing to the exterior wall of the pipeline, wherein no portion of the passive pipeline pig signal intrudes into an interior of the pipeline;
  - at least one vibration sensor [11] housed by the housing; and
  - signal processing means [23] including at least one band pass filter [27] configured to receive at least a portion of the data collected by the at least one vibration sensor.

* * * * *